United States Patent [19]

Santy et al.

[11] Patent Number: 4,812,821

[45] Date of Patent: Mar. 14, 1989

[54] VISUAL FIRE ALERT SYSTEM

[76] Inventors: Michael J. Santy, 161 Kenwood Ave.; Terence J. Santy, 236 Carbon St., both of Syracuse, N.Y. 13208

[21] Appl. No.: 41,929

[22] Filed: Apr. 24, 1987

[51] Int. Cl.$^4$ ........................ G08B 1/08; H04M 11/04

[52] U.S. Cl. ................................ 340/538; 340/310 R; 340/310 CP

[58] Field of Search ............... 340/538, 310 R, 310 A, 340/310 CP

[56] References Cited

U.S. PATENT DOCUMENTS

| | | | |
|---|---|---|---|
| 2,867,795 | 1/1959 | Longton et al. | 340/538 |
| 3,462,756 | 8/1969 | Mills | 340/538 |
| 3,631,433 | 12/1971 | Dix | 340/538 |
| 3,689,886 | 9/1972 | Durkee | 340/310 CP |
| 4,635,040 | 1/1987 | Masot | 340/310 CP |

*Primary Examiner*—Donnie L. Crosland
*Attorney, Agent, or Firm*—Charles S. McGuire

[57] ABSTRACT

A fire alert system providing a visual signal, such as a flashing light, in the event of actuation of one or more heat or smoke-sensing detectors. Each detector is wired to an alarm panel, as is a small signal transmitter having prongs for connection to a wall receptacle in an existing wiring circuit. When a detector is actuated, indicating the presence or possibility of a fire, relay contacts are closed in both the alarm panel and the transmitter to cause a signal to be transmitted through the wiring circuit from the transmitter to one or more receivers, also plugged into receptacles of the wiring circuit for actuation by the signal from the transmitter. A high intensity light associated with each receiver flashes in response to the actuating signal, thereby providing the visible fire alert signal.

10 Claims, 1 Drawing Sheet

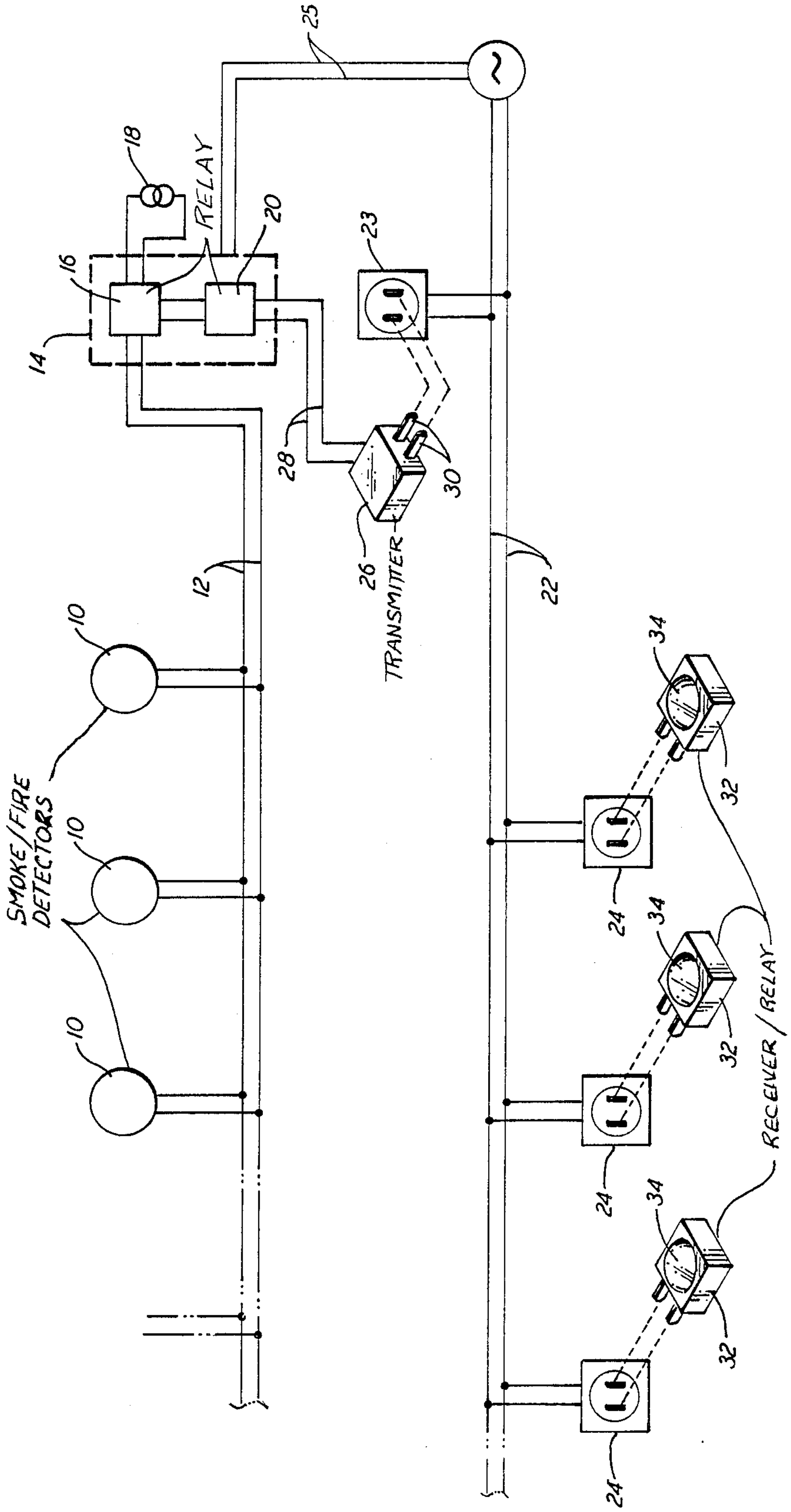
25
18
RELAY
20
23
16
14
28
30
26
TRANSMITTER
12
22
10
SMOKE/FIRE DETECTORS
10
10
34
32
24
34
32
24
RECEIVER/RELAY
34
32
24

VISUAL FIRE ALERT SYSTEM

BACKGROUND OF THE INVENTION

The present invention relates to visual fire alert systems and, more particularly, to novel and improved means for transmitting signals indicating the occurrence or possible occurrence of a fire to receivers positioned at selected locations for actuation to emit a flashing light or other visual alarm.

Smoke or heat-responsive detectors are commonly positioned within dwellings, public buildings, and other structures, to emit an audible alarm signal to warn individuals within hearing range of the potential presence of a fire in the structure. Such audible alarms are ineffective, however, for deaf persons or those with significant hearing loss. Accordingly, visual signalling systems have been devised for use in areas normally occupied by deaf or hearing-impaired individuals. For example, alarm or signal systems employing high intensity strobe lights are disclosed in U.S. Pat. Nos. 3,810,170 and 4,499,453. The former is designed to operate on 115v and/or 24v AC power, and the latter functions on DC within the range of approximately 4.5 to 40v. Although it is recognized that either system may operate on other power sources, it is nonetheless necessary to connect the individual signal devices to the power supply or distribution system by means of wiring provided expressly for such purpose.

Such wiring connections are eliminated by actuation of a lighting device by sound emitted from an audible smoke alarm, such as disclosed in U.S. Pat. Nos. 4,258,291 and 4,570,155, but these systems rely upon the audible device to provide the alarm and are intended to actuate a portable lamp for use in evacuating the premises. Another patent teaching the combined use of an audible alarm with an emergency light to assist in evacuation of the building is U.S. Pat. No. 4,199,754, wherein existing building wiring may be utilized for connecting one lighting device to the power source while a separately wired battery power supply operates the audible alarm and auxiliary or emergency lights. Other fire alert or alarm systems which include lighting means are disclosed in U.S. Pat. Nos. 4,074,225 and 4,305,069, as well as elsewhere in the prior art. The prior systems, however, all rely upon either self-contained circuitry in portable type devices or separately provided wiring connections to provide the necessary connection of the alarm device to the power source.

It is a principal object of the present invention to provide a fire or smoke alert system making full use of existing building wiring to supply an actuating signal to the alarm device.

A further object is to provide a fire alert system particularly directed to visual alarm devices distributed throughout a building and controlled from a remote location.

Another object is to provide a visual alarm signal for the hearing impaired employing plug-in alarm devices operable by signals transmitted over existing wiring circuits.

Other objects will in part by obvious and will in part appear hereinafter.

SUMMARY OF THE INVENTION

The fire warning system of the invention is incorporated in a building which is wired in the usual manner for 110v–120v AC power (herein referred to for convenience as 115v), with wall receptacles and other common wiring devices attached to the household circuits in desired locations throughout the building. Conventional smoke and/or heat sensing detectors are also positioned in desired locations in the building and are wired to a likewise conventional central alarm panel having relay contacts which are closed in response to actuation of any one of the detectors. A signal transmitter having a tuned coil for emitting a high frequency signal for transmission over an electrical conductor is hard wired to the alarm panel, preferably in close proximity to a wall receptacle of the building wiring circuit. Closing a set of relay contacts in the alarm panel connects a further relay in the transmitter device to provide power for actuation of the transmitter coil, and transmission of the signal through the building wiring circuit, to which the transmitter is connected by being plugged into the wall receptacle near the alarm panel.

Receiver devices each having a coil responsive to the signal from the transmitter are plugged into wall receptacles at desired locations in the building. A set of relay contacts in each receiver is closed in response to actuation of the receiver coils by the signal transmitted through the building wiring circuit by the transmitter coil. Also associated with each receiver is a high intensity light sources, preferably of the intermittently flashing type, such as a strobe light, which is connected to a power source by closure of the receiver relay, thereby providing the desired visual alert signal.

BRIEF DESCRIPTION OF THE DRAWING

The FIGURE is a diagrammatic illustration of the fire alert system of the invention.

DETAILED DESCRIPTION

Referring now to the single drawing Figure, reference numeral 10 denotes conventional smoke and/or heat sensing detectors which are permanently mounted in desired locations in a building wherein the system of the invention is to be employed. Detectors 10 are of the well-known type which are actuated in response to the presence of smoke and/or heat above a predetermined threshold level. Each of detectors 10 is connected by electrical transmission lines 12 to central alarm panel 14 in the usual manner to operate one or more relays in the panel in response to a signal from any of the detectors indicating the presence of smoke and/or heat. In the illustrated version, a signal from one of detectors 10 serves to the contacts of a first relay 16, which may serve to initiate operation of an audible alarm, sprinkler system, or any other device(s), indicated diagrammatically at 18, which the presence of smoke and possibility of fire in the building may dictate, as well as a second relay 20. The latter are normally present as open, unwired contacts in alarm panels and are, in fact, the only contacts in the alarm panel pertinent to the present invention.

An existing wiring circuit of the building wherein the fire alert system is installed is indicated by wires 22, carrying the usual 115v AC (herein referred to as 115v) domestic power supply. Wires 22 carry electrical power to all points where it is required in the building, being connected in the usual manner to wiring devices such as wall receptacles, switches, etc. A first such wall receptacle, in close physical proximity (e.g., a few feet) to alarm panel 14, is indicated by reference numeral 23, and a plurality of second receptacles by numeral 24.

Alarm panel 14 receives AC power for connection to the relays and other equipment in the panel through lines 25, which will normally not be in the same circuit with lines 22.

Transmitter device 26 is connected by wires 28 to the contacts of relay 20 of alarm panel 14, and is plugged into wall receptacle 23 by prongs 30 extending from one side of the transmitter. Receiver devices 32 are likewise plugged into individual receptacles 24 and are thus connected through wires 22 to transmitter 26. Associated with each of receivers 32, either by being incorporated in the housing thereof or being otherwise electrically connected thereto, is a strobe lamp 34, or other high intensity light source, preferably of the intermittently flashing type, which serves as the visual alarm device of the fire alert system. Transmitter 26 includes a tuned coil which emits an electrical signal of predetermined frequency when actuated in response to closure of contacts within transmitter 26 by power through lines 28 upon closure of relay 20. Each of receivers 32 includes a coil tuned to the frequency of the transmitter coil for actuation by the signal emitted thereby to close a switch providing power to the associated lamp 34.

Lamps 34 may be operated by the 115v AC power on lines 22, to which the lamps are connected upon closure of the switch in response to actuation by the receiver coil. Alternatively, lamps 34 may be adapted for 6, 12 or 24v DC operation by a battery of corresponding voltage associated with each receiver, in which case a charging circuit is also preferably provided, utilizing the 115v AC power to insure that adequate charging of the battery is maintained. Also, the receiver circuitry may be adapted to supply DC power to the lamp from the AC circuit, by an appropriate transformer and rectifier, with battery back-up being provided in the event of AC power failure. If the components of the receiver, including the lamp, render the unit too large or heavy to be supported by the plug-in connection to the wall receptacle, a line cord with a plug may be provided on the receivers, which may then rest upon a separate support.

Thus, the present invention provides a fire alert system particularly directed to the hearing impaired which insures a highly visible alarm in required locations in a building with a minimum of installation time and cost. The only hard wiring required, beyond that already present in the existing building wiring circuits and connections from the detectors to the alarm panel, is the relatively short connection between the panel and the transmitter. As many receivers as desired may be connected to wall receptacle in a given circuit for actuation by a single transmitter. After actuation, the receivers and lamps are deactivated by resetting the alarm panel relays, and are thereupon prepared for further actuation. The receivers may, of course, include an audible alarm, if desired.

What is claimed is:

1. A fire alert system for the hearing impaired in a building having an existing 115v AC wiring circuit, said system comprising:

(a) a plurality of detectors positioned at selected locations within said building and connected in a first portion of said circuit, each of said detectors being actuable in response to sensed presence of smoke and/or heat above a predetermined level to emit a first electrical signal through said wiring circuit;

(b) an alarm panel connected in said circuit and including a first normally open relay switch and means for closing said first switch in response to said first signal;

(c) a transmitter device having signal generating means actuable to emit a second electrical signal for transmission on an electrical conductor;

(d) means connecting said transmitter device to said first switch for actuation of said signal generating means in response to closing said first switch;

(e) a plurality of wall receptacles connected in a second portion of said circuit on the opposite side of said alarm panel from said first portion;

(f) first plug means connecting said transmitter device to one of said wall receptacles for transmission of said second electrical signal through said second portion of said wiring circuit;

(g) at least one receiver device having a second normally open relay switch and signal receiving means responsive to said second electrical signal to close said second switch;

(h) second plug means connecting said receiver device to another of said wall receptacles for receiving said second electrical signal through said second portion of said wiring circuit; and (i) visual alarm means actuable in response to closure of said second switch.

2. The invention according to claim 1 wherein said visual alarm means comprises a high intensity lamp.

3. The invention according to claim 2 wherein said lamp is an intermittently flashing lamp.

4. The invention according to claim 2 wherein said lamp is a strobe lamp.

5. The invention according to claim 2 wherein said second switch, signal receiving means and lamp are housed in a common housing.

6. The invention according to claim 2 wherein said lamp is powered by AC power on said wiring circuit.

7. The invention according to claim 1 and further including a third normally open switch in said alarm panel, means for closing said third switch in response to said first signal, and a fire-related device actuable in response to closing of said third switch.

8. The invention according to claim 7 wherein said device is an audible alarm.

9. The invention according to claim 7 wherein said device is a sprinkler system.

10. A visual alarm fire alert system for use in a building having a wiring circuit including a plurality of wall receptacles and a plurality of detectors actuable in response to the presence of smoke and/or heat above a predetermined threshold level and an alarm panel to which said detectors are connected, said alarm panel having normally open first and second relay switches which are closed in response to actuation of any one of said detectors, closure of said first switch being effective to actuate a device related to the presence of fire in said building, said system comprising:

(a) a signal transmitter including a first coil electrically connected to and actuable in response to closure of said second relay switch to transmit a high frequency electrical signal over a conductor;

(b) first plug means for connecting said transmitter to one of said wall receptacles for transmission of said electrical signal over the conductors of said wiring circuit;

(c) a signal receiver including a second coil actuable in response to said electrical signal and a third relay switch which is closed in response to actuation of said second coil;

(d) second plug means for connecting said receiver means to another of said wall receptacles for receiving said electrical signal by said second coil; and (e) a lamp connected to a power supply to emit a high intensity light in response to closure of said third switch.

* * * * *